Jan. 5, 1971 — W. J. SCOTT — 3,552,772
WEIGHT TRANSFER HITCH
Filed Oct. 3, 1968 — 2 Sheets-Sheet 1

Inventor
WALTER J. SCOTT
BY
Tweedale & Gerhardt
Attorneys

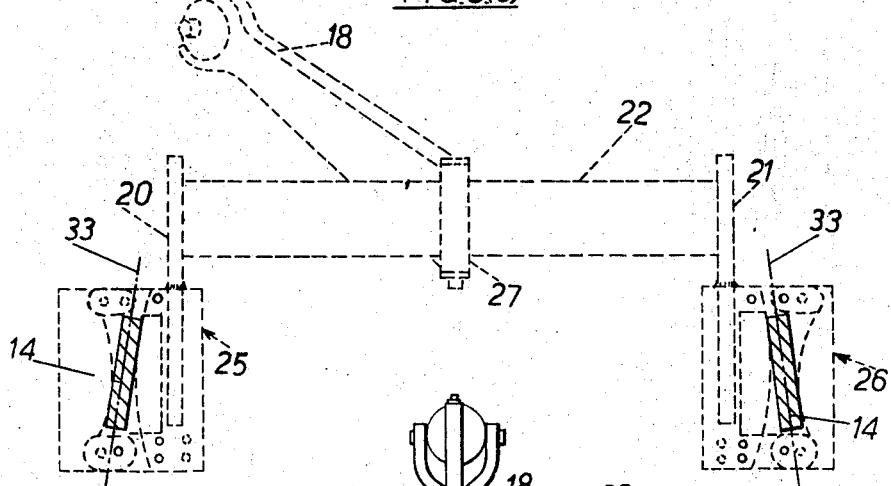
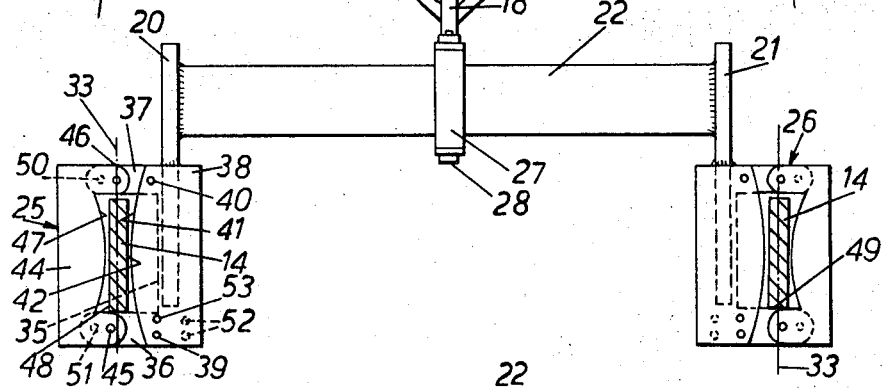
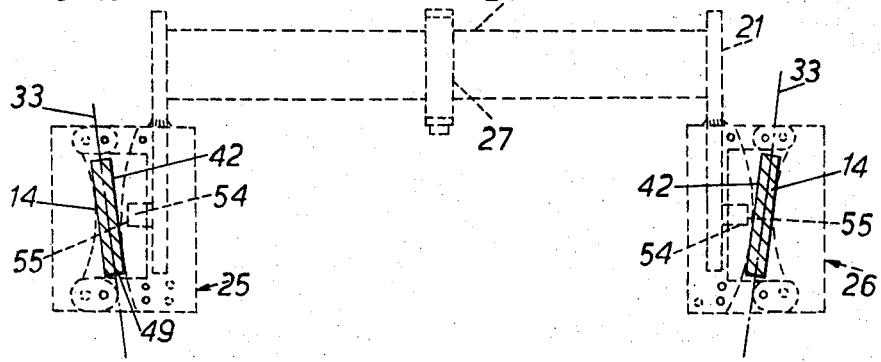

United States Patent Office 3,552,772
Patented Jan. 5, 1971

3,552,772
WEIGHT TRANSFER HITCH
Walter J. Scott, Coventry, England, assignor to Massey-Ferguson Services N.V., Curacao, Netherlands Antilles, a corporation of the Netherlands Antilles
Filed Oct. 3, 1968, Ser. No. 764,702
Claims priority, application Great Britain, Nov. 28, 1967, 54,032/67
Int. Cl. B62d *53/00*
U.S. Cl. 280—405   3 Claims

ABSTRACT OF THE DISCLOSURE

A weight transfer hitch mounted on the lower draft links of a tractor, the hitch including pins connected to the rear ball joints of the draft links and releasable loading carrying brackets embracing the draft links forwardly of the ball joints in a manner so as to allow pivoting of the draft links on their longitudinal axes relative to the hitch, such pivoting occurring during raising and lowering of the draft links. The load carrying brackets have opposed convex inner portions that contact the sides of the draft links to permit the pivoting and at the same time carry lateral loads imposed during turning of the tractor.

---

This invention relates to weight transfer tractor hitches for use with tractors of the type having a pair of spaced draft links extending rearwards from the tractor and under the control of a power lift by means of which the draft links may be raised and lowered.

The invention provides a tractor hitch for use in coupling a ground-engaging implement or a towed vehicle to such a tractor so that weight transfer from the implement or vehicle to the tractor may be achieved together with provision for relative lateral swinging in a horizontal plane between the tractor and the implement or vehicle.

The invention relates to a tractor hitch for use with a tractor of the type stated, said hitch including a support or load carrying member adapted to be connected to each draft link both at the rearward end of the latter, by a pin for connection to the conventional rear ball and socket joint of the link, and also forwardly of the rearward end by mounting means which securely attach the support to the link while allowing freedom between the support and the link for turning of the link about its longitudinal axis as the latter is raised and lowered.

A preferred embodiment of the invention will now be described, by way of example, with reference to the accompanying drawings, in which.

FIGS. 3(a), 3(b) and 3(c) are a series of transverse sectional elevations looking rearwardly from a vertical plane cutting the draft links immediately to the rear of the connection thereto of the drop links, but with the draft links in different positions.

Figure 1:
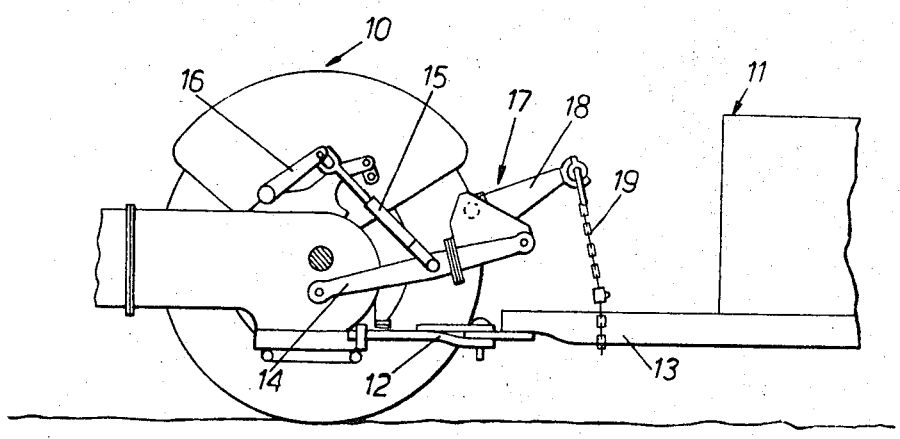
FIG. 1 is a fragmentary diagrammatic side elevation of a tractor coupled to a wheeled vehicle.

Referring to the drawings, FIG. 1 shows a tractor, generally indicated 10, coupled to a vehicle 11 by means of a drawbar 12 rigidly connected to the tractor and pivotally connected to a drawbar 13 rigid with the vehicle. The tractor includes the usual spaced lower draft links 14 and drop links 15 by means of which the draft links can be raised and lowered through lift arms 16 connected to a ram forming part of the tractor hydraulic system. A tractor hitch, generally indicated 17, includes a swingable boom 18 and is mounted on the draft links 14. A flexible weight transfer member in the form of a chain 19 hangs freely from the rear end of the boom 18 and is connected in any suitable manner to the drawbar 13 of the vehicle to act to lift the same.

Figure 2:
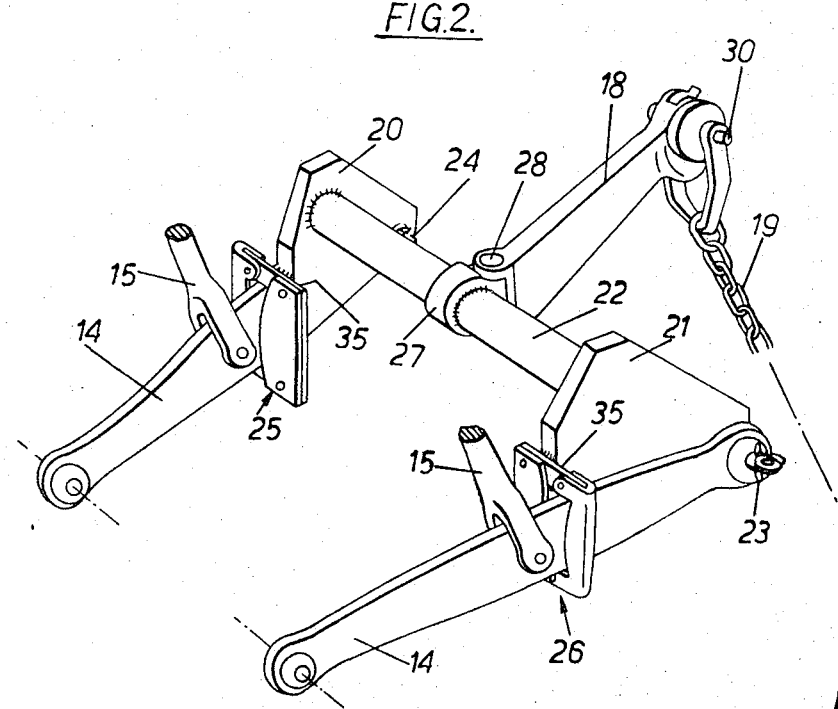
FIG. 2 is a perspective view of a tractor hitch according to the invention.

Referring to FIG. 2, the tractor hitch 17 includes a support comprising side legs or plates 20, 21 rigidly connected together by a cross piece or member 22. The side legs or plates are basically of triangular shape with flattened apices and the rear ends thereof are provided with pins 23, 24, respectively, for connection to the rear ends of the draft links 14. Each such connection, as is usual, comprises a universal ball and socket joint carried by the draft link with the pin 23 or 24 passing through the socket. Mounting means in the form of load carrying brackets generally indicated 25, 26, and which will be described in detail below, are provided on the front end of each plate 20, 21 for engagement with the draft links at two points spaced forwardly of the pins 23, 24. The pins 23, 24 and brackets 25, 26 mount the support on the draft links 14 with the lower side of the triangle of each plate substantially aligned with the lower side of the pertaining link, the flattened apices as each end of the lower side of the triangle substantially normal to the longitudinal axis of said link, and the other flattened apex located above the link and substantially parallel to the longitudinal axis. The cross piece or member 22 abuts the mutually opposed or inwardly facing surfaces of the plates 20, 21 above the level of the links 14 and is welded or otherwise secured in position.

A bracket 27 is mounted centrally on the cross piece or member 22 and carries an upright pivot pin 28. The boom 18 is pivotally mounted on the pin 28 for free swinging movement from side to side. As best seen in FIG. 2, the chain 19 is connected to the outer end of the boom 18 by pivot pin 30, the free end of the chain being attached to the drawbar 13 of the implement.

The tractor hitch is most useful when used in combination with a tractor equipped with automatic pressure control by virtue of which weight transfer from the vehicle to the tractor is automatically maintained constant. In operation, if the vehicle falls relatively to the tractor resulting in a downward pull on the chain 19, the boom 18 is pulled downwards resulting in a downward load on the draft links 14. This results, through the drop links 15 and lift arms 16, in an increase in pressure in the ram which is sensed by the automatic pressure control system which then exhausts fluid from the ram till the pressure returns to its original value. This results in downward movement of the draft links 14 and boom 18 so that the tension in the chain 19 is reduced and the weight transferred from the vehicle to the tractor is restored to its initial value.

Similarly, if the vehicle rises relatively to the tractor, the drawbar 13 will rise, thus removing the load from the chain 19. This reduces the pressure in the ram and the pressure-control system causes fluid to be supplied to the ram thus raising the draft links 14 and hitch 17 until the chain tension is restored to its original value.

By virtue of the pivotal mounting of the boom 18, this automatic pressure control may take place when the tractor and vehicle are not in line, as when turning a corner.

It is desirable, particularly with relatively larger tractors where relatively heavy loads may be taken from the vehicle or implement through the hitch 17 to the tractor, that the hitch be rigidly attached by the bracket 25, 26 to the draft links, thus ensuring that each link takes a proportion of the load to minimize the possibility of breakage of a draft link. This rigidity, however, is sometimes difficult to accomplish since the draft links in many tractors turn or rotate about their longitudinal axes as they are raised and lowered.

FIG. 3 shows at a, b, and c, respectively, the hitch attached to the tractor draft links when the latter are in their lowermost, middle and uppermost (transport) positions, respectively. The draft links 14 are rectangular in cross-section with the planes 33 cutting therethrough centrally intermediate the major faces thereof generally upwardly directed. Due, however, to the aforesaid rotation or turning of the links about their longitudinal axes as they are raised and lowered, the planes 33 diverge upwardly in their lowermost positions of the links, are parallel in the middle position of the links, and converge upwardly in the uppermost, or transport, position of the links. This change in angle effect arises due to the general geometry including the lengths and relative positioning of the various parts of the tractor hitch linkage, including the draft links 14, drop links 15 and lift arms 16. Accordingly, it is necessary in the design of the hitch 17 to allow for this rotation turning, which may be termed the "geometrical turn," to take place, and the brackets 25, 26 are designed such that while allowing the turning movement of the draft links they contain them sufficiently to provide extra support against turning and share the load between the two links.

The brackets 25, 26 are of similar construction and only the bracket 25 will be described, particularly with reference to FIG. 3. The bracket 25 includes a channel-shaped member 35 rigidly attached at its base to the leg or plate 20, with the arms 36, 37 forming a channel opening in the outward direction and in which the draft link 14 may be received. An inner guide plate 38 is rigidly attached to the member 35, as by bolts at the points 39, 40, and has an outwardly-facing convex surface 41 against which the inner face 42 of the draft link 14 may bear. A retaining latch 44 is pivotally connected at 45 to the arm 36 and is normally held in position by a pin 46 passing through the latch and the arm 37 so that a convex inwardly directed surface 47 may bear against the outer face 48 of the draft links.

In the position shown in FIG. 3b the draft links are in their middle position, and the gap between the surfaces 41 and 47 in each bracket 25 and 26 is such that the link fits in with a small clearance from each of the surfaces. If the load on the boom 18 is cenrtally directed, that is, the boom is facing directly rearwardly, then the lower edge 49 of the draft link bears against the arm 36 to take the load. If, however, the load is such that the draft link tends to deform then this deforming movement can take place only to a small degree before the link side edges 42 and 48 contact the arcuate faces 41 and 47, respectively, which then support the link and transfer some load onto the second draft link.

The general turn due to vertical movement of the links is, of course, possible because each link is, as shown in the three positions of FIG. 3, free to turn slightly and in all positions only a small movement of a link due to load is possible before it becomes supported by the arcuate faces 41 and 47.

To accommodate a different size of draft link a second pair of holes 50, 51 may be provided in the arms 36 and 37 for the reception respectively of the latch pin 46 and pivot 45. Similarly to provide for storage of the plate 38 in the event that it is not needed, two holes 52 in the member 35 may be provided to cooperate with the fixing hole 39 and a storage hole 53 in the plate.

What is claimed is:

1. A weight transfer hitch for connecting an implement or towed vehicle having a drawbar to a tractor having a pair of rearwardly extending draft links, the hitch including a transverse frame member having coupling means on the ends thereof for pivotal connection to the rear ends of the tractor draft links, a pair of bracket means on said frame each adapted to engage one of said draft links at a point forward of said coupling means, said bracket means configured to support said frame on said links for up and down movement therewith and to prevent relative lateral movement theretbetween while at the same time permitting rotation of each draft link about its longitudinal axis relative to said bracket and frame, and lift means carried by said frame member adapted to be connected to the implement drawbar to transfer lifting forces from the tractor through the draft links and weight transfer hitch to the drawbar.

2. The weight transfer hitch of claim 1 wherein said lift means comprises a rearwardly extending boom pivotally mounted on the transverse frame on a substantially vertical axis for swinging movement from side to side and adapted to carry a flexible tension member in turn adapted to connect to the implement or towed vehicle drawbar.

3. A tractor having a pair of rearwardly extending draft links mounted for pivotal up and down swinging movement, a weight transfer hitch mounted on the linkage comprising a transverse frame member having a rear portion pivotally connected to the ends of the draft links and having a pair of bracket members thereon each enclosing one of said draft links at a point forward of said rear portion, said bracket means configured to support said frame on said links for up and down movement therewith and to prevent relative lateral movement therebetween while at the same time permitting rotation of each draft link about its longitudinal axis relative to said brackets and frame, and lift means carried by said frame carrying a flexible tension member adapted to be connected to the drawbar of a towed implement or vehicle to transfer weight from such implement or vehicle to the tractor as said draft links are raised.

References Cited

UNITED STATES PATENTS

| 2,673,092 | 3/1954 | Sutherland | 280—406 |
| 3,062,561 | 11/1962 | Wulff et al. | 280—405B |
| 3,341,224 | 9/1967 | Bultheel et al. | 280—405B |
| 3,347,560 | 10/1967 | Hodges et al. | 280—405B |
| 3,435,902 | 4/1969 | Folkerts | 172—7X |

LEO FRIAGLIA, Primary Examiner

U.S. Cl. X.R.

172—7